United States Patent [19]

Bergano et al.

[11] Patent Number: 5,309,535
[45] Date of Patent: May 3, 1994

[54] APPARATUS AND METHOD UTILIZING A ROTATING WAVEPLATE FOR REDUCING POLARIZATION DEPENDENT HOLE-BURNING IN AN AMPLIFIED OPTICAL TRANSMISSION SYSTEM

[75] Inventors: Neal S. Bergano, Lincroft; Vincent J. Mazurczyk; Paul F. Wysocki, Scotch Plains, all of N.J.

[73] Assignee: AT&T Bell Laboratories, Murray Hill, N.J.

[21] Appl. No.: 56,214

[22] Filed: Apr. 30, 1993

[51] Int. Cl.$^5$ .......................... G02B 6/10; G02B 5/30; H01S 3/10
[52] U.S. Cl. ........................................ 385/38; 385/25; 385/31; 385/39; 385/147; 359/181; 359/188; 359/246; 359/333; 359/337; 359/339; 372/27; 372/6
[58] Field of Search .................... 385/1, 2, 4, 8, 9, 10, 385/11, 24, 25, 27, 28, 31, 37, 38, 39, 147; 359/122, 156, 181, 188, 245, 246, 256, 301, 333, 341, 345, 337, 339; 372/27, 26, 14, 108, 6

[56] References Cited

U.S. PATENT DOCUMENTS

| | | | |
|---|---|---|---|
| 4,389,090 | 6/1983 | LeFevre | 385/11 X |
| 4,762,384 | 8/1988 | Hegarty | 385/11 X |
| 4,805,977 | 2/1989 | Tamura et al. | 385/38 X |
| 4,923,291 | 5/1990 | Edagawa et al. | 372/27 X |
| 4,988,169 | 1/1991 | Walker | 385/11 X |
| 5,031,236 | 7/1991 | Hodgkinson et al. | 385/11 X |
| 5,034,679 | 7/1991 | Henderson et al. | 324/96 |
| 5,043,996 | 8/1991 | Nilsson et al. | 372/94 |
| 5,101,461 | 3/1992 | Nakajima | 385/38 X |
| 5,127,066 | 6/1992 | Poggiolini | 385/24 |
| 5,191,631 | 3/1993 | Rosenberg | 385/38 X |
| 5,218,652 | 6/1993 | Lutz | 385/11 X |
| 5,223,705 | 6/1993 | Aspell et al. | 372/27 X |

OTHER PUBLICATIONS

"Polarisation Fluctuations in a 147 km Undersea Lightwave Cable During Installation", C. D. Poole, et al. Electronics Letters, vol. 23, No. 21, Oct. 8, 1987, pp. 1113-1115.

"Observation of New Polarisation Dependence Effect in Long Haul Optically Amplified System", M. G. Taylor OFC'93 Post-deadline paper, Feb. 1993 pp. 25-28.

"Spectral Gain Hole-Burning at 1.53 $\mu$m in Erbium-Doped Fiber Amplifiers", E. Desurvire et al. IEEE Photonics Tech. Lett., vol. 2, No. 4, Apr. 1990, pp. 246-248.

"Polarized Fluorescence Line Narrowing Measurements of Nd Laser Glasses: Evidence of Stimulated Emission Cross Section Anisotropy", D. W. Hall and M. J. Weber Appl. Phys. Lett., vol. 42, No. 2, Jan. 15, 1983, pp. 157-159.

"Spectral and Polarization Hole Burning in Neodymium Glass Lasers", D. W. Hall et al. IEEE J. of Quantum Electronics, vol. QE-19, No. 11, Nov. 1983, pp. 1704-1717.

*Primary Examiner*—Brian Healy
*Attorney, Agent, or Firm*—Robert P. Marley

[57] ABSTRACT

A technique for reducing signal degradation and fading within a long optical transmission by utilizing a rotating waveplate arrangement to rotate the SOP of an optical signal launched into the transmission system, and thereby minimize polarization dependent hole-burning ("PDHB"). This effectively reduces the degree of polarization of the launched optical signal, without degrading the noise and dispersion characteristics of the signal. The rate of waveplate rotation is chosen to ensure that the SOP of the launched signal does not remain at a particular SOP long enough to anisotropically saturate any optical amplifier employed within the transmission system, and give rise to PDHB.

8 Claims, 1 Drawing Sheet

APPARATUS AND METHOD UTILIZING A ROTATING WAVEPLATE FOR REDUCING POLARIZATION DEPENDENT HOLE-BURNING IN AN AMPLIFIED OPTICAL TRANSMISSION SYSTEM

TECHNICAL FIELD

The invention relates to the optical transmission of information and, more particularly, to improving transmission capabilities over very long optical transmission paths employing intermediate repeater amplifiers.

BACKGROUND OF THE INVENTION

Very long optical fiber transmission paths, such as those employed in undersea or trans-continental terrestrial lightwave transmission systems which employ optical amplifier repeaters, are subject to decreased performance due to a host of impairments that increase as a function of the length of the optical fiber comprising the transmission path. Typically, in such long optical transmission systems, these impairments vary with time and cause a random fluctuation in the signal-to-noise ratio ("SNR") of the transmission path. This random fluctuation contributes to a phenomenon known as signal fading. Signal fading can result in an increased bit error rate ("BER") for digital signals transmitted via the optical fiber path. When the SNR of a digital signal within such a transmission system becomes unacceptably small (resulting in an undesirably high BER), a signal fade is said to have occurred. Experimental evidence has shown that polarization dependent effects, induced by the optical fiber itself and/or other optical components (e.g., repeaters, amplifiers, etc.) along the transmission path, contribute to signal fading and SNR fluctuations. In particular, one of these effects has now been identified as polarization dependent hole-burning ("PDHB"), which is related to the population inversion dynamics of the optical amplifiers. A discussion of hole-burning is provided by D. W. Douglas, R. A. Haas, W. F. Krupke, and M. J. Weber in "Spectral and Polarization Hole Burning in Neodymium Glass Lasers"; IEEE Journal of Quantum Electronics, Vol. QE-19, No. 11, November 1983.

PDHB reduces gain of the optical amplifiers within the long haul transmission system for any signal having a state of polarization ("SOP") parallel to that of the primary optical signal carried by the transmission system. However, the gain provided by these amplifiers for optical signals having an SOP orthogonal to that of the primary signal remains relatively unaffected. In simplified terms, the primary optical signal produces an anisotropic saturation of the amplifier that is dependent upon the SOP of the primary optical signal. The anisotropic saturation reduces the level of population inversion within the amplifier, and results in a lower gain for optical signals having the same SOP as the primary optical signal. This effectively causes the amplifier to preferentially enhance noise having an SOP orthogonal to that of the primary signal. This enhanced noise lowers the SNR of the transmission system and causes an increased BER.

Prior methods for reducing signal fading have included the use of systems that actively adjust the SOP of a signal launched into a given optical path, as a function of the quality of the signal received at the far end of the path. However, the dynamic polarization controllers and extremely long feedback paths employed within such systems increase overall complexity and costs, and reduce reliability. Another method employs a non-polarized light source to transmit information over an optical fiber path. Since a non-polarized light source shares its optical power equally on two orthogonally oriented planes within the fiber deleterious polarization dependent effects should be minimized. Unfortunately, non-polarized light sources produce signals having wide bandwidths, which exhibit poor noise and dispersion characteristics that make them impractical for use over very long transmission paths. These previously attempted methods to alleviate signal fading have proved impractical, and fail to specifically address the problem of PDHB.

SUMMARY OF THE INVENTION

The present invention reduces signal degradation and fading within a long optical transmission system through the minimization of PDHB, by utilizing a rotating waveplate arrangement to rotate the SOP of an optical signal launched into the transmission system. This effectively reduces the degree of polarization of the launched optical signal without degrading the noise and dispersion characteristics of the signal. The rate of waveplate rotation is chosen to ensure that the SOP of the launched signal does not remain at a particular SOP long enough to anisotropically saturate any optical amplifier employed within the transmission system, and give rise to PDHB.

DETAILED DESCRIPTION OF THE INVENTION

Figure 1:
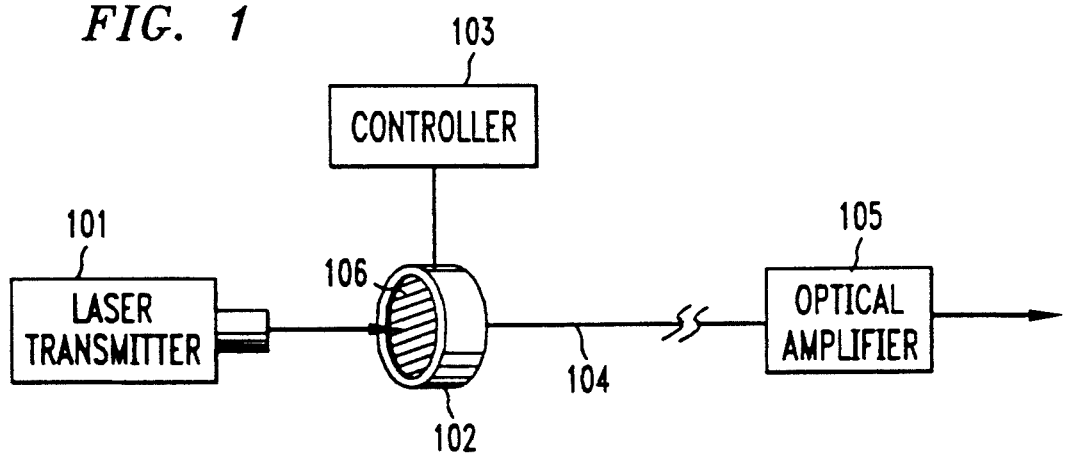
FIG. 1 is a simplified block diagram of first exemplary arrangement, including a rotating waveplate assembly, which facilitates the practice of the invention.

FIG. 1 shows a simplified block diagram of an exemplary arrangement facilitating the practice of the invention. As shown, the arrangement includes laser transmitter 101, rotating waveplate assembly 102, waveplate controller 103, very long single-mode optical fiber 104, and optical amplifier 105. Laser transmitter 101 produces a linearly polarized, encoded optical signal which, after passing through rotating waveplate assembly 102, is launched into single-mode optical fiber 104 for transmission to a remote receiver. Optical amplifier 105 serves as a repeater amplifier for the encoded optical signal traveling upon single-mode optical fiber 104.

Rotating waveplate assembly 102 includes a one-half wavelength waveplate 106 that rotates in response to control signals received from waveplate controller 103. Both mechanically and electro-optically rotatable waveplate assemblies are well-known in the art. As is also well-known in the art, rotating a one-half wavelength waveplate at $\theta°$/second causes the SOP of a linearly-polarized optical signal passing through the waveplate to rotate at a rate of $2\theta°$/second.

Erbium-doped fiber amplifiers (a type amplifier typically employed as repeaters within long-haul optical fiber transmission systems) require approximately 1 to 2 ms of exposure to an optical signal having a fixed SOP before population inversion levels are reduced by PDHB. This minimum exposure time prior to population inversion reduction is called the amplifier's saturation time ("$t_s$"). If the SOP of a signal traveling through such an amplifier is oscillated at frequency greater than $1/t_s$, PDHB-induced anisotropic saturation will be avoided.

Assuming optical amplifier 105 has a saturation time of 1 ms, the minimum SOP modulation frequency for a signal traveling along single-mode optical fiber 104 would be 1 kHz. However, to ensure that the rate of polarization oscillation is placed well beyond the minimum frequency required to avoid PDHB-induced anisotropic saturation, a control signal is applied to rotating waveplate assembly 102 that results in an SOP rotation rate of at least 10 kHz. To accomplish this, the control signal would have to cause the one-half wavelength waveplate to rotate at a rate of 5 kHz or greater.

It will be understood that the particular embodiment described above is only illustrative of the principles of the present invention, and that various modifications could be made by those skilled in the art without departing from the scope and spirit of the present invention, which is limited only by the claims that follow. One such modification would include employing rotating assemblies having more than one waveplate, and/or rotating assemblies employing one-quarter wavelength waveplates.

We claim:

1. An apparatus for reducing the effects of polarization dependent hole-burning within an optical transmission system employing optical fiber amplifiers, comprising:
   an optical waveplate assembly;
   means for generating a polarized optical signal;
   means for launching said polarized optical signal so that it passes through said optical waveplate assembly;
   means for rotating said optical waveplate assembly to induce a modulation of the state of polarization of said polarized optical signal, said modulation being at a frequency greater than or equal to $1/t_s$, where $t_s$ is the minimum saturation time exhibited by any of the optical amplifiers within said optical transmission system; and
   means for launching the modulated polarized optical signal into said optical transmission system.

2. The invention of claim 1 wherein said optical waveplate assembly includes a rotatable one-half wavelength waveplate.

3. The invention of claim 1 wherein said optical waveplate assembly includes a rotatable one-quarter wavelength waveplate.

4. The invention of claim 1 wherein said optical waveplate assembly includes a mechanically rotatable waveplate.

5. The invention of claim 1 wherein said optical waveplate assembly includes an electro-optically rotatable waveplate.

6. A method for reducing the effects of polarization dependent hole-burning within an optical transmission system employing optical fiber amplifiers, comprising the steps of:
   generating a polarized optical signal;
   launching said polarized optical signal so that it passes through an optical waveplate assembly;
   rotating said optical waveplate assembly to induce a modulation of the state of polarization of said polarized optical signal, said modulation being at a frequency greater than or equal to $1/t_s$, where $t_s$ is the minimum saturation time exhibited by any of the optical amplifiers within said optical transmission system; and
   launching the modulated polarized optical signal into said optical transmission system.

7. The method of claim 6 wherein said step of rotating said optical waveplate assembly includes mechanically rotating at least one optical waveplate.

8. The method of claim 6 wherein said step of rotating said optical waveplate assembly includes electro-optically rotating at least one optical waveplate.

* * * * *